United States Patent
Yun et al.

(10) Patent No.: US 11,660,556 B2
(45) Date of Patent: May 30, 2023

(54) FILTER COMPRISING A COATING LAYER OF FLAKE-LIKE POWDERS AND A PREPARATION METHOD THEREOF

(71) Applicant: ASFLOW CO., LTD., Gyeonggi-do (KR)

(72) Inventors: Jung Yeul Yun, Gyeongsangnam-do (KR); Man Ho Park, Gyeonggi-do (KR); Keun Hak Lee, Gyeonggi-do (KR); Doo Hong Kang, Gyeonggi-do (KR)

(73) Assignee: ASFLOW CO., LTD, Gyeonggi-Do (KR)

( * ) Notice: Subject to any disclaimer, the term of this patent is extended or adjusted under 35 U.S.C. 154(b) by 0 days.

(21) Appl. No.: 16/627,187

(22) PCT Filed: Jun. 19, 2019

(86) PCT No.: PCT/KR2019/007375
§ 371 (c)(1),
(2) Date: Dec. 27, 2019

(87) PCT Pub. No.: WO2020/004857
PCT Pub. Date: Jan. 2, 2020

(65) Prior Publication Data
US 2021/0354065 A1  Nov. 18, 2021

(30) Foreign Application Priority Data
Jun. 29, 2018 (KR) .................. 10-2018-0075418

(51) Int. Cl.
*B01D 39/20* (2006.01)

(52) U.S. Cl.
CPC .. *B01D 39/2034* (2013.01); *B01D 2239/0471* (2013.01); *B01D 2239/0654* (2013.01);
(Continued)

(58) Field of Classification Search
CPC ........ B01D 39/2034; B01D 2239/0471; B01D 2239/0654; B01D 2239/10;
(Continued)

(56) References Cited

U.S. PATENT DOCUMENTS

| | | | |
|---|---|---|---|
| 3,453,104 A | | 7/1969 | de Marchi et al. |
| 4,562,039 A | * | 12/1985 | Koehler ................. B01D 39/12 |
| | | | 427/244 |
| 5,843,390 A | * | 12/1998 | Plinke ...................... B01J 31/06 |
| | | | 423/239.1 |
| 6,652,804 B1 | | 11/2003 | Neumann et al. |

(Continued)

FOREIGN PATENT DOCUMENTS

| | | |
|---|---|---|
| KR | 10-0679332 | 1/2007 |
| KR | 10-1064959 | 9/2011 |

(Continued)

OTHER PUBLICATIONS

Ruder, et al. "Wet Powder Spraying—A Process for the Production of Coatings" Surface and Coatings Technology, vol. 53, 1992, pp. 71-74.

*Primary Examiner* — Robert A Hopkins
*Assistant Examiner* — Qianping He
(74) *Attorney, Agent, or Firm* — Workman Nydegger (57) ABSTRACT

It is an object of the present invention to provide a filter having excellent filtration rate and excellent permeability and a method for producing the same. To achieve the above object, the present invention provides a filter comprising a porous metal support having the first pore size; and a metal coating layer formed on the support and having the second pore size smaller than the first pore size, wherein the coating layer has a three-dimensional pore structure by bonding flake-shaped metal powders. The present invention also provides a method for producing the filter. According to the present invention, as the flake-shaped second powders form a coating layer, the porosity increases and the permeability (Continued)

increases, and as the flow channel becomes more complicated, the filtration rate also increases.

9 Claims, 5 Drawing Sheets

(52) U.S. Cl.
CPC .. *B01D 2239/10* (2013.01); *B01D 2239/1208* (2013.01); *B01D 2239/1216* (2013.01); *B01D 2239/1241* (2013.01)

(58) Field of Classification Search
CPC .... B01D 2239/1208; B01D 2239/1216; B01D 2239/1241
USPC .......................................................... 55/523
See application file for complete search history.

(56) References Cited

U.S. PATENT DOCUMENTS

| | | | |
|---|---|---|---|
| 2007/0102487 A1* | 5/2007 | Suzuki | H05K 1/111 228/101 |
| 2008/0107806 A1 | 5/2008 | Mergner et al. | |
| 2009/0238646 A1 | 9/2009 | Sansalone | |
| 2010/0173070 A1* | 7/2010 | Niu | H01B 1/00 427/304 |
| 2015/0225302 A1* | 8/2015 | Cai | B01D 39/2075 55/523 |
| 2016/0061709 A1* | 3/2016 | Kaufman | G01N 15/082 378/53 |

FOREIGN PATENT DOCUMENTS

| | | |
|---|---|---|
| KR | 10-2011-0127225 | 11/2011 |
| KR | 10-1971645 B1 | 4/2019 |

\* cited by examiner

FILTER COMPRISING A COATING LAYER OF FLAKE-LIKE POWDERS AND A PREPARATION METHOD THEREOF

CROSS-REFERENCE TO RELATED APPLICATIONS

This application claims priority to PCT Application No. PCT/KR2019/007375, filed Jun. 19, 2019, entitled "Filter Comprising a Coating Layer of Flake-Like Powders and a Preparation Method Thereof," which claims benefit of and priority to Korean Patent Application No. 10-2018-0075418, filed Jun. 29, 2018, all of which are incorporated herein by reference in their entirety.

BACKGROUND OF THE INVENTION

1. Field of the Invention

The present invention relates to a filter comprising a flake-shaped powder coating layer and a manufacturing method thereof.

2. Description of the Related Art

As the industry develops, high efficiency filters are required for semiconductor equipments and gas filters.

For example, in the conductor industry, even when the concentration of the trace impurities contained in many process gases used in the manufacturing process is several ppm of billions or less, the poor product performance and the reduced manufacturing yield can be caused. Thus, inline gas filters which are serially connected to the supply line of the process gas are widely used to remove impurity particles in the process gas. In addition, the use of filters for a gas filter is increasing as the environmental standards for dust emission become stricter.

Such a filter is a high efficiency filter when both the filtration rate that is the ability to filter the filtration target and the permeability that is the degree through which the fluid including the filtration target permeates the filter are excellent. However, if the pore size is reduced to increase the filtration rate, the permeability decreases, and if the pore size is increased to increase the permeability, the filtration rate is lowered. If the permeability is lowered, there are problems that the overall filtration efficiency is lowered, and the excessive load can be applied to the device on which the filter is mounted.

Korean Patent Publication No. 10-2011-0127225 discloses a filter for filtering particulate matter from exhaust gas emitted from a compression ignition engine, specifically, a filter for filtering particulate matter (PM) from exhaust gas emitted from a compression ignition engine, which filter comprising a porous substrate having inlet surfaces and outlet surfaces, wherein the inlet surfaces are separated from the outlet surfaces by a porous structure containing pores of a first mean pore size, wherein the porous substrate is coated with a wash coat comprising a plurality of solid particles comprising a molecular sieve promoted with at least one metal wherein the porous structure of the wash coated porous substrate contains pores of a second mean pore size, and wherein the second mean pore size is less than the first mean pore size. However, the above technique has a problem that the flow channel through which the particulate matter flows is not sufficiently complicated, so that the filtration rate can be reduced, and the permeability of the particulate matter can also be reduced depending on the pore size.

Korean Patent No. 10-1064959 discloses a depth filtration air filter medium for gas turbine in-take air and turbo compressor in-take air purification and a depth filtration air filter cartridge using thereof, specifically, a depth filtration air filter medium for gas turbine in-take air and turbo compressor in-take air purification comprising the first layer to collect dust particles with large particle size, consisting of an electrostatic nonwoven fabric medium with the fineness of 0.5 denier~6 denier and a spunbond support layer; the intermediate layer to increase cumulative collection comprising a thermal bond nonwoven fabric medium, the bendable low-melting polyester with the pressure loss of 0.5 mmAq or less at the face velocity 5.3 cm/sec, consisting of the outer side of 100% low melting polyester having lower melting point than ordinary polyester and the inner side of 100% ordinary polyester (Sheath/Core), or consisting of the outer side and the inner side of 50% of low melting polyester and 50% of ordinary polyester (Side by Side) with the fineness of 6 denier~20 denier and the weight of 40 $g/m^2$~200 $g/m^2$; and the last layer that can be folded to suppress the increase of the pressure loss and to increase the cumulative collection amount by increasing the aggregation effect of the particulate matter such as fine dust, comprising an ultrafine electrostatic melt-blown medium with the fineness of 0.07 denier~0.9 denier; wherein the composite medium has the total weight of 100 $g/m^2$~400 $g/m^2$, the NaCl particle efficiency of 95% or more and the pressure loss of 4.5 mmAq or less at the surface velocity of 5.3 cm/sec, and is bendable. However, since the filter uses a nonwoven fabric medium as a raw material, there is a problem that the permeability of the filtration target may be lowered.

Thus, the present inventors have completed this invention by studying a filter that can improve the filtration rate and permeability of the filter simultaneously.

PRIOR ART REFERENCE

[Patent Reference]
(Patent Reference 1) Korean Patent Publication No. 10-2011-0127225
(Patent reference 2) Korean Patent No. 10-1064959

SUMMARY OF THE INVENTION

It is an object of the present invention to provide a filter having excellent filtration rate and excellent permeability and a manufacturing method thereof.

To achieve the above object, the present invention provides a filter comprising a porous metal support having the first pore size; and a metal coating layer formed on the support and having the second pore size smaller than the first pore size, wherein the coating layer has a three-dimensional pore structure by bonding flake-shaped metal powders.

The present invention also provides a method for producing a filter comprising the following steps:
forming a porous metal support having the first pore size;
forming a coating layer by spraying flake-shaped metal powders on the formed support by wet powder spraying process; and
sintering the coating layer.

Advantageous Effect

According to the present invention, as the flake-shaped second powders form a coating layer, the porosity increases and the permeability increases, and as the flow channel becomes more complicated, the filtration rate also increases. Compared with the case of using the sphere-shaped powders, the thickness of the coating layer for obtaining the same permeability and filtration rate is relatively thin, there is an advantage that the amount of the coating layer raw material can be reduced. In addition, since the flow channel is very complicated by the flake-shaped powders forming the coating layer, there is an advantage that there is no need to introduce an additional layer for filtration of fine particles.

DESCRIPTION OF THE PREFERRED EMBODIMENTS

Hereinafter, the present invention is described in detail.

The present invention relates to a filter, particularly, a filter for semiconductor equipments or a filter for gas filters, and more particularly, a filter having the high filtration rate for the filtration target and also having the excellent air permeability and a method of manufacturing the same.

The present invention provides a filter comprising a porous metal support having the first pore size; and a metal coating layer formed on the support and having the second pore size smaller than the first pore size, wherein the coating layer has a three-dimensional pore structure by bonding flake-shaped metal powders.

In the present invention, 'filtration degree' or 'filtration rate' means the degree to which the substance to be filtered is filtered, and 'transmittance', 'permeability', 'air permeability' or 'mold permeability' means the degree to which the substance to be filtered passes through the filter.

Hereinafter, the filter of the present invention will be described in detail for each configuration.

The filter of the present invention comprises a porous metal support having the first pore size. In general, the support in a filter has the large pore size through which the filtration target can permeate, through which the filtration target permeates and moves to the coating layer thereon, and some of the filtration target is filtered by the support.

On the other hand, the first pore size of the porous support is preferably 5 µm to 100 µm. If the pore size is less than 5 µm, the air permeability of the filtration target is lowered, so that the filtration efficiency is lowered, and the load is severely applied to the filtration device. If the pore size exceeds 100 µm, there is a problem that the mechanical property of the support is lowered and it is difficult to form a coating layer made of flake-shaped metal powders.

The filter of the present invention comprises a metal coating layer formed on the support and having the second pore size smaller than the first pore size, wherein the coating layer has a three-dimensional pore structure by bonding flake-shaped metal powders.

The filtration target that has passed through the support layer is filtered through the three-dimensional pore structure formed in the coating layer. That is, the three-dimensional pore structure of the coating layer becomes a flow channel of the filtration target.

At this time, the second pore size of the coating layer of the present invention is smaller than the first pore size of the support. The filtration object reaching the coating layer past the support is filtered while flowing in the three-dimensional pore structure in the coating layer having the second pore size smaller than the first pore size of the support. Since the second pore size of the coating layer is smaller than the first pore size of the support, it is more likely that the particles of smaller size among the materials included in the filtration target that have passed through the support are filtered out of the coating layer.

On the other hand, the coating layer according to the present invention is characterized in that the flake-shaped metal powders, not sphere-shaped metal powders, are conjugated, to have a three-dimensional pore structure.

Unlike a sphere-shape, the flake-shape means a structure having a certain thickness and a substantially flat top and bottom surfaces. At this time, the top and bottom surfaces can have a sphere or oval shape.

When the longest axis length of the flake-shape is A, the shortest axis length is B, and the thickness is C, the size of the flake-shaped metal powder is defined as follows. In addition, the aspect ratio thereof is defined as follows.

$$\text{Equivalent Diameter} = (A \times B)^{1/2}$$

$$\text{Size of flake-shaped metal powder} = \Pi \times (\text{equivalent diameter}/2)^2$$

$$\text{Aspect Ratio} = \text{equivalent diameter}/C$$

The flake-shaped metal powder size of the coating layer of the present invention preferably has an equivalent diameter of 5 µm to 100 µm. If the equivalent diameter is less than 5 µm, there is a problem that the pressure loss is increased because the size of the powder is small. If the equivalent diameter exceeds 100 µm, there is a problem that the pressure loss is increased by blocking the pores because the particles are larger than the first pore size of the support.

The aspect ratio of the flake-shaped metal powder of the coating layer of the present invention is preferably 5 to 100. If the aspect ratio of the flake-shaped metal powder is less than 5, the flake becomes spherical and the complexity of the flow channel formed by the three-dimensional pore structure of the coating layer is reduced, so that the filtration rate for the filtration target is decreased. If the aspect ratio exceeds 100, the flake-shape disappears during the sintering process, so that the pore size and porosity of the coating layer are decreased.

The porosity of the coating layer of the present invention is preferably in the range of 35% to 55%. If the porosity is less than 35%, there is a problem that the permeability of the filtration target is significantly lowered, so that the excessive load can be applied to the filtration device. If the porosity exceeds 55%, there is a problem that the filtration rate for the filtration target is reduced, so that the function as a filter is lowered.

At this time, the second pore size of the coating layer of the present invention is smaller than the first pore size of the support, which is preferably in the range of 0.1 µm to 1 µm.

If the second pore size is less than 0.1 μm, the permeability of the filtration target is significantly reduced, so that the filtration efficiency is lowered, and the excessive load can be applied to the filtration device. If the second pore size exceeds 1 μm, there is a problem that the filtration rate for the filtration target is reduced, so that the function as a filter is lowered.

The coating layer of the present invention forms a three-dimensional pore structure by bonding flake-shaped metal powders. The formed three-dimensional pore structure becomes a flow channel through which the filtration target moves. The conventional filters have a problem in that the filtration rate and the permeability are lowered as the coating layer is formed using sphere-shaped powders.

The coating layer of the present invention uses flake-shaped metal powders, so that the three-dimensional pore structure formed by the powders becomes very complicated, and the flow channel until the filtration target to pass through the filter becomes very complicated and long, thereby improving the filtration rate. In addition, unlike the conventional sphere-shaped powders, the flake-shaped metal powders used in the present invention are stacked in various orientations and prevented from forming waste pores, thereby increasing the porosity, so that the permeability of the filtration target is improved.

The filter of the present invention includes a coating layer having a three-dimensional pore structure by bonding flake-shaped metal powders, so that a thicker coating layer can be formed when using the same amount of raw materials as compared to the case of using sphere-shaped powders. Nevertheless, the permeability can be further improved than when using sphere-shaped powders. As the coating layer becomes thicker, the filtration rate can thus be further improved. In addition, when forming the coating layer of the same thickness, the coating layer according to the present invention uses a smaller amount of raw materials than when using sphere-shaped powders, and nevertheless, the permeability can be further improved. Therefore, the filter of the present invention can be used as a filter for semiconductor equipments or a filter for gas filters to avoid the load on the device even though a high filtration rate is required, and can be applied to various other applications.

Meanwhile, the support and the coating layer of the present invention can be a stainless uniaxial pressing-based, Ni-based or Ti-based support and coating layer, and the materials forming the support and the coating layer can be the same or different from each other.

As described above, the filter according to the present invention has the advantages that both the filtration rate and the permeability for the filtration target are improved compared to the case of using the conventional sphere-shaped powders.

The present invention also provides a method for producing a filter comprising the following steps:

forming a porous metal support having the first pore size;

forming a coating layer by spraying flake-shaped metal powders on the formed support by wet powder spraying process; and sintering the coating layer.

Hereinafter, the manufacturing method according to the present invention is described in detail step by step.

The manufacturing method of the present invention comprises a step of forming a porous metal support having the first pore size.

In general, the support in a filter has the large pore size through which the filtration target can permeate, through which the filtration target permeates and moves to the coating layer thereon, and some of the filtration target is filtered by the support. The step of forming the support can be performed by, for example, charging metal powders in a mold and then molding and sintering thereof, but not always limited thereto.

On the other hand, the first pore size of the porous support is preferably 5 μm to 100 μm. If the pore size is less than 5 μm, the air permeability of the filtration target is lowered, so that the filtration efficiency is lowered, and the load is severely applied to the filtration device. If the pore size exceeds 100 μm, there is a problem that the mechanical property of the support is lowered and it is difficult to form a second layer made of flake-shaped metal powders.

The manufacturing method of the present invention comprises a step of forming a coating layer by spraying flake-shaped metal powders on the formed support by wet powder spraying process.

The wet powder spraying process is a method of spraying a liquid mixture to form a coating layer. The liquid mixture generally comprises powder, binder and carrier. After spraying is performed, the carrier is first evaporated to remove, and the binder maintains adhesion between the powders and between the powders and the substrate to form a green coating. Thereafter, the binder is removed through heat treatment such as sintering, and the adhesion is formed by interdiffusion between the powders and between the powder and the substrate. In the wet powder spraying process, since a relatively small amount of binder is used, the process of removing the binder is very short, and there is an advantage in that it can be performed by a continuous process in a single furnace.

According to the manufacturing method of the present invention, a coating layer is formed by spraying flake-shaped metal powders on the support by the wet powder spraying process as described above. So, it has the advantage of forming a coating layer having a uniform thickness while having a complicated flow channel on the support of various shapes such as plate, tube, circle, irregularity, etc.

The aspect ratio of the flake-shaped metal powder of the coating layer of the present invention is preferably 5 to 100. If the aspect ratio of the flake-shaped metal powder is less than 5, the flake becomes spherical and the complexity of the flow channel formed by the three-dimensional pore structure of the coating layer is reduced, so that the filtration rate for the filtration target is decreased. If the aspect ratio exceeds 100, the flake-shape disappears during the sintering process, so that the pore size and porosity of the coating layer are decreased.

The manufacturing method of the present invention comprises a step of sintering the formed coating layer. Through such sintering, the binder used in the wet powder spraying process is removed, and flake-shaped metal powders are bound to each other to form a three-dimensional pore structure.

At this time, the step of sintering the coating layer is preferably performed at the temperature of 600° C. to 1300° C. for 30 to 120 minutes. If the sintering temperature is less than 600° C., the binder is not sufficiently removed, and the adhesion between the powders and the powders and the support is not sufficiently secured. If the sintering temperature exceeds 1300° C., the flake-shape disappears during the sintering process, and the pore size of the coating layer is reduced or the porosity is lowered, so that the filtration rate and the permeability for the filtration target are reduced. If the sintering time is less than 30 minutes, the binder is not sufficiently removed, and the adhesion between the powders and the powders and the support is not sufficiently secured.

If the sintering time exceeds 120 minutes, the flake-shape disappears during the sintering process, and the pore size of the coating layer is reduced or the porosity is lowered, so that the filtration rate and the permeability for the filtration target are reduced.

The porosity of the coating layer of the present invention is preferably in the range of 35% to 55%. If the porosity is less than 35%, there is a problem that the permeability of the filtration target is significantly lowered, so that the excessive load can be applied to the filtration device. If the porosity is more than 55%, the filtration rate for the filtration target is lowered, so that the function as a filter is reduced.

At this time, the second pore size of the coating layer of the present invention is smaller than the first pore size of the support, which is preferably in the range of 0.1 μm to 1 μm. If the second pore size is less than 0.1 μm, there is a problem that the permeability of the filtration target is significantly lowered, so that the excessive load can be applied to the filtration device. If the second pore size is more than 1 μm, the filtration rate for the filtration target is lowered, so that the function as a filter is reduced.

On the other hand, the support and the coating layer of the present invention can be a stainless uniaxial pressing-based, Ni-based or Ti-based support and coating layer, and the materials forming the support and the coating layer can be the same or different from each other.

Practical and presently preferred embodiments of the present invention are illustrative as shown in the following Examples, Comparative Examples and Experimental Examples.

However, it will be appreciated that those skilled in the art, on consideration of this disclosure, may make modifications and improvements within the spirit and scope of the present invention.

Example 1

SUS316L powders having the average size of 30 μm were charged in a disc mold, followed by uniaxial pressing to prepare a molded body. The molded body was sintered at 850° C. for 1 hour to prepare a disk-shaped porous support with large pores having a thickness of 5 mm and a diameter of 20 mm.

A mixed solution was prepared by mixing 0.146 g of the flake-shaped SUS316L powders having the equivalent diameter of 30 μm and the thickness of 1 μm and the polyvinyl alcohol binder with ethanol, and then spraying it on the porous support by wet powder spraying process to form a coating layer. In the wet powder spraying process, the diameter of the spray nozzle was 0.8 mm, and the distance between the spray nozzle and the porous support was fixed at 200 mm.

After the coating layer was formed, a filter was prepared by sintering at 950° C. for 30 minutes. The thickness of the coating layer after sintering was 139 μm.

Example 2

A filter was prepared by the same manner as described in Example 1, except that the coating layer was formed by spraying 0.288 g of flake-shaped SUS316L powders.

Example 3

A filter was prepared by the same manner as described in Example 1, except that the coating layer was formed by spraying 0.065 g of flake-shaped SUS316L powders.

Comparative Example 1

A filter was prepared by the same manner as described in Example 1, except that the coating layer was formed by using 0.129 g of sphere-shaped powders having a diameter of 7 μm. The thickness of the coating layer after sintering was 70 μm.

Comparative Example 2

A filter was prepared by the same manner as described in Comparative Example 1, except that the coating layer was formed by using 0.341 g of sphere-shaped powders.

Comparative Example 3

A filter was prepared by the same manner as described in Comparative Example 1, except that the coating layer was formed by using 0.527 g of sphere-shaped powders.

Comparative Example 4

SUS316L powders having the average size of 30 μm were charged in a disc mold, followed by uniaxial pressing to prepare a molded body. The molded body was sintered at 850° C. for 1 hour to prepare a disk-shaped porous support with large pores having a thickness of 5 mm and a diameter of 20 mm.

Experimental Example 1

To confirm the pore structure of the prepared filter, the following experiment was performed. The top surface of the coating layer of the filter prepared in Example 1 was observed with a scanning electron microscope (SEM), and the results were shown in FIG. 1.

Figure 1:
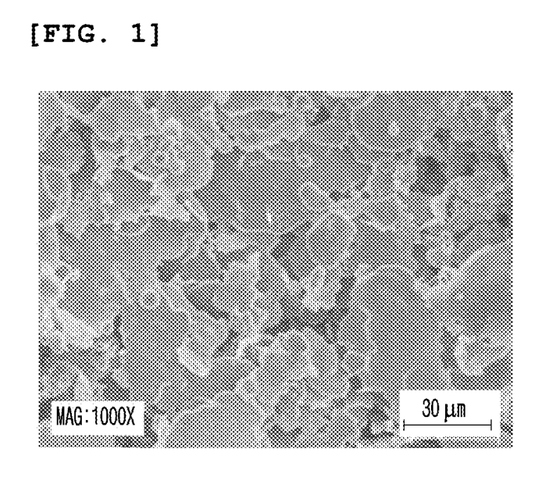
FIG. 1 is a SEM photograph of the upper surface of the filter coating layer prepared in the example of the present invention.

As shown in FIG. 1, it was confirmed that the coating layer of the filter prepared in Example 1 of the present invention was actually formed by bonding flake-shaped powders.

Experimental Example 2

To confirm the porosity of the prepared filter, the following experiment was performed. The side of the filters prepared in Example 1 and Comparative Example 1 was observed with a scanning electron microscope (SEM), and the results were shown in FIG. 2. In addition, the porosity of each filter coating layer was measured using an image analyzer from the scanning electron microscope observation results. As a result, the porosity of the coating layer of the filter prepared in Example 1 was 48%, and the porosity of the coating layer of the filter prepared in Comparative Example 1 was 35%. That is, the porosity of the coating layer prepared in Example 1 was about 37% higher than the porosity of the coating layer prepared in Comparative Example 1. As described above, since the coating layer of the filter of the present invention had a high porosity, the permeability of the filtration target was greatly improved. In addition, the filtration rate of the filtration target was also greatly improved by the highly complicated three-dimensional pore structure formed by flake-shaped powders.

Figure 2:
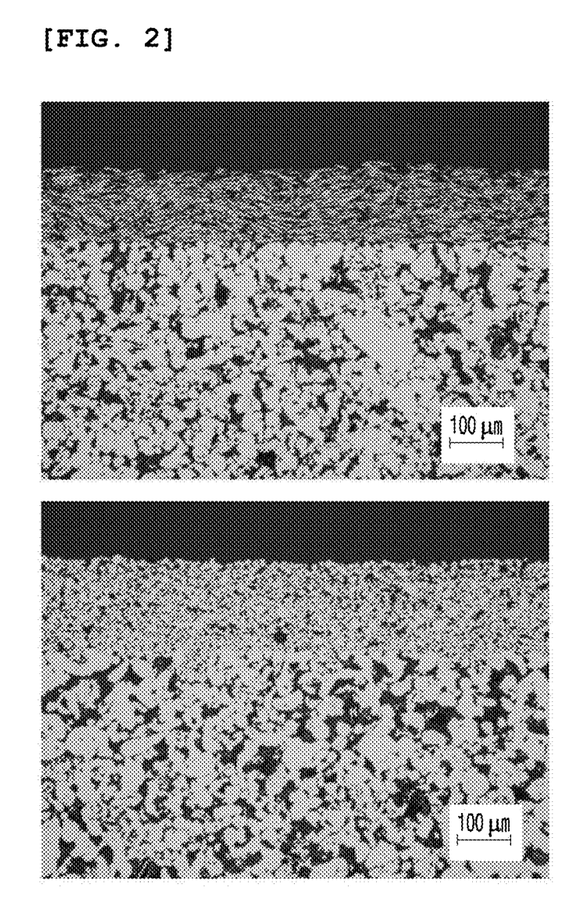
FIG. 2 is a set of SEM photographs of the side surface of the filters prepared in the example and comparative example of the present invention.

As shown in FIG. 2, the flake-shaped powders were stacked in a plate shape in the coating layer of the filter prepared in Example 1, and thus, a very complicated flow channel having a high porosity was formed. On the other hand, in the coating layer of the filter prepared in Comparative Example 1, the sphere-shaped powders with different sizes were stacked and fill the empty space, so that the porosity was lowered and the pore size was reduced. Through this, it was confirmed that the filter of the present invention could easily maintain the porosity of the coating layer to a certain level or more, and had an effect of improving the filtration rate for the filtration target through the complicated flow channel.

Experimental Example 3

To confirm the difference of the coating layer when the same amount of raw materials for the coating layer was used, the following experiment was performed. The thickness of the coating layer of the filters prepared in Example 1 and Comparative Example 1 was measured. In Example 1, 0.146 g of flake-shaped powders was used, and in Comparative Example 1, 0.129 g of sphere-shaped powders was used. That is, almost the same amount of raw material powders was used in Example 1 and Comparative Example 1. As a result, the thickness of the coating layer of Example 1 was 139 μm, whereas the thickness of the coating layer of Comparative Example 1 was only 70 μm, which was half of the thickness of the coating layer of Example 1. Through this, it was confirmed that a thicker coating layer could be formed by the method of the present invention when using the same amount of raw materials. The thicker the coating layer, the longer the flow channel through which the filtration target flows, thereby improving the filtration rate for the filtration target. Therefore, the method of the present invention has the advantage of producing a filter that can obtain a better filtration rate when using the same amount of raw materials.

Experimental Example 4

To confirm the air permeability when the same amount of raw materials for the coating layer was used, the following experiment was performed. The air permeability was measured by measuring the amount of air permeated as the pressure of compressed air increases by measuring the amount of air that permeates through the filter while increasing the pressure of compressed air on one side of the filter using Capillary Flow Porometer with the filters of Example 1, Comparative Example 1 and Comparative Example 4, and the results were shown in FIG. 3.

Figure 3:
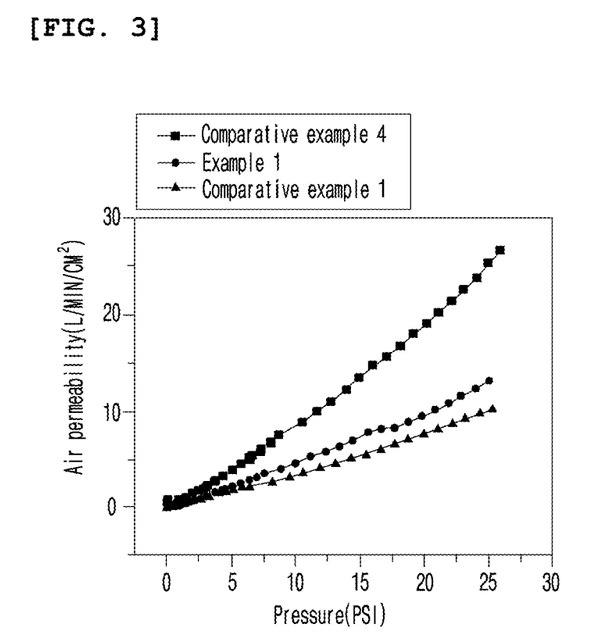
FIG. 3 is a graph illustrating the air permeability of the filters prepared in the example and comparative example of the present invention.

As shown in FIG. 3, although the coating layer of Example 1 was thicker than the coating layer of Comparative Example 1, the air permeability was higher when the similar amount of raw materials for the coating layer was used. Through this, it was confirmed that the filter according to Example 1 of the present invention had better filtration rate (because of a thicker thickness) and better air permeability (transmittance) for the filtration target than the filter of Comparative Example 1. This means that not only the efficiency of the filter was excellent, but also the load applied to the filter device could be reduced.

Experimental Example 5

To confirm the air permeability of each filter when the thickness of the coating layer was the same, the following experiment was performed. The air permeability was measured by measuring the amount of air permeated as the pressure of compressed air increases by measuring the amount of air that permeates through the filter while increasing the pressure of compressed air on one side of the filter using Capillary Flow Porometer with the filters of Example 1, Comparative Example 2 and Comparative Example 4, and the results were shown in FIG. 4. The coating layer thickness of the filter of Example 1 was 139 μm, and the coating layer thickness of the filter of Comparative Example 2 was 165 μm. That is, the coating layer thicknesses of both filters were similar.

Figure 4:
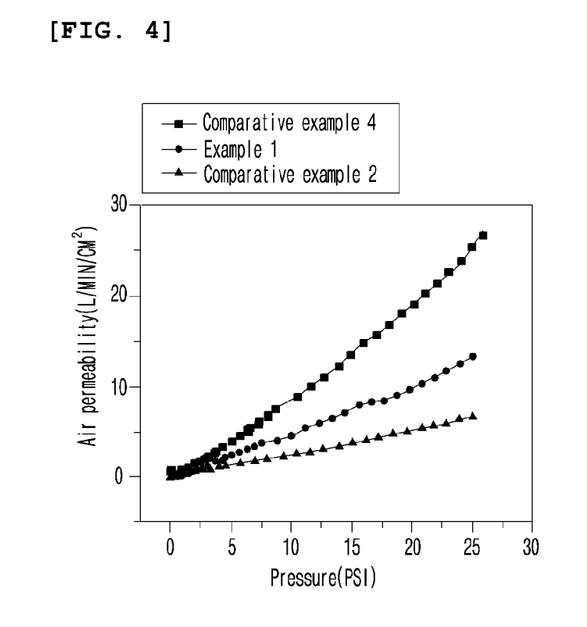
FIG. 4 is an additional graph illustrating the air permeability of the filters prepared in the example and comparative example of the present invention.

As shown in FIG. 4, when the thickness of the coating layer was similar, the air permeability of the filter prepared in Example 1 of the present invention was superior to that of the filter prepared in Comparative Example 2. Through this, it was confirmed that the filter according to the present invention had excellent filtration efficiency and could reduce the load applied to the filter device.

Experimental Example 6

To confirm the pore size distribution of the filter as the amount of coating was increased when forming the coating layer using different types of powders, the following experiment was performed. The filters prepared in Examples 1-3 and Comparative Examples 1-3 were impregnated completely in a fluid with low surface tension and low vapor pressure using Capillary Flow Porometer, so that all pores in the filter were filled with the fluid, and then the pressure was gradually increased using compressed air. As the compressed air pressure increased, the volume and the pressure of the compressed air coming out through the inside of the sample were measured. After eliminating the fluid, the compressed air pressure was raised once again and then the volume and the pressure of the compressed air coming out through the sample were measured, by which the pore size was measured, and the results were shown in FIG. 5.

Figure 5:
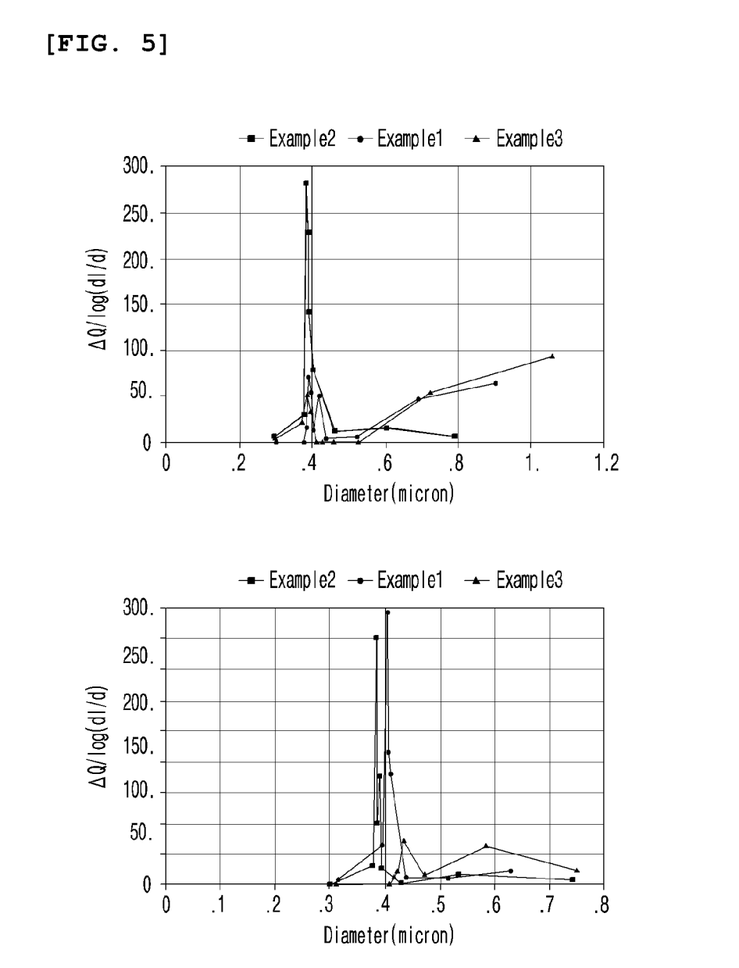
FIG. 5 is a set of graphs illustrating the pore size distribution of the filters prepared in the example and comparative example of the present invention.

As shown in FIG. 5, it was confirmed that the pore size was decreased as the amount of coating was increased in the cases of Example and Comparative Example. As the pore size was decreased, smaller particles could be filtered through the filter. In addition, compared with the filter of Comparative Example coated with sphere-shaped powders, the filter of Example coated with flake-shaped powders was confirmed that the average pore size was similar, but the pore size distribution was wider. Due to this effect, coating with flake-shaped powders has an advantage that the particles with the wider size distribution can be filtered compared to the case of coating with sphere-shaped powders.

What is claimed is:
1. A filter, comprising:
a porous metal support layer having first pores, the first pores having a first average pore size; and
a metal coating layer formed on the porous metal support layer, the metal coating layer having a three-dimensional pore structure formed of flake-shaped metal particles, each of the flake-shaped metal particles being interdiffusion-bonded to neighboring flake-shaped metal particles, the three-dimensional pore structure having second pores, each of the second pores being formed by portions of the flake-shaped metal particles, the second pores having a second average pore size that is smaller than the first average pore size,
wherein the metal coating layer has a thickness that is less than a thickness of the porous metal support layer.
2. The filter according to claim 1, wherein the first average pore size is in the range of 5 μm to 100 μm.
3. The filter according to claim 1, wherein an equivalent diameter of each of the flake-shaped metal particles is 5 μm to 100 μm.

4. The filter according to claim 1, wherein the flake-shaped metal particles have an aspect ratio of 5 to 100.

5. The filter according to claim 1, wherein the porosity of the metal coating layer is 35% to 55%.

6. The filter according to claim 1, wherein the second average pore size of the metal coating layer is 0.1 μm to 1 μm.

7. A gas filtration equipment product comprising the filter according to claim 1.

8. The filter according to claim 1, wherein the metal coating layer is formed on a surface of the porous metal support layer.

9. A filter, comprising:
a porous metal support layer having first pores, the first pores having a first average pore size in the range of 5 μm to 100 μm; and
a metal coating layer formed on a surface of the porous metal support layer, the metal coating layer consisting of a three-dimensional pore structure formed of flake-shaped metal particles, each of the flake-shaped metal particles being interdiffusion-bonded to neighboring flake-shaped metal particles of the metal coating layer, the flake-shaped metal particles having an aspect ratio of 5 to 100 and an equivalent diameter of 5 μm to 100 μm, wherein the porosity of the metal coating layer is 35% to 55%, the three-dimensional pore structure having second pores, each of the second pores being formed by portions of the flake-shaped metal particles, the second pores having a second average pore size of 0.1 μm to 1 μm,
wherein the metal coating layer has a thickness that is less than a thickness of the porous metal support layer.

* * * * *